United States Patent Office 2,760,964
Patented Aug. 28, 1956

2,760,964

BIS-QUINOLINIUM COMPOUNDS

Herbert Clare Carrington and Edwin Harry Paterson Young, Blackley, Manchester, England, assignors to Imperial Chemical Industries Limited, London, England, a corporation of Great Britain No Drawing. Application March 8, 1955,
Serial No. 493,054

Claims priority, application Great Britain March 10, 1954

13 Claims. (Cl. 260—286)

This invention relates to new quinoline derivatives and more particularly it relates to new quinoline derivatives which are useful as chemotherapeutic agents particularly in the treatment of babesiasis (piroplasmosis) and related diseases of animals.

According to the invention we provide new quinoline derivatives which are quaternary salts of the formula

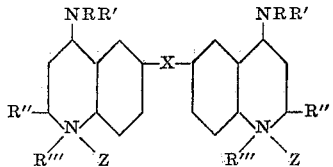

wherein X stands for —NH—, —O—, —S—, —SO—, —SO₂—, —CH₂— or —CH=CH—, R and R' stand for hydrogen or for alkyl radicals, R" and R''' stand for alkyl radicals and Z stands for an anionic group.

We have found that the said new quinoline derivatives are effective in the suppression of experimental infections of *Babesia rodhaini* in mice. Thus we have found that di-(4-methylamino-1:2-dimethyl-6-quinolinium)amine diiodide suppresses infections of *Babesia rodhaini* in mice at a dose of 0.01 mg. daily for 3 days. The highest tolerated dose is greater than 5 mg. daily. The effective dose is thus lower, and the highest tolerated dose higher, than is the case with the known chemotherapeutic agents used in the treatment of babesiasis. A particularly effective compound is also di-(4-methylamino-1:2-dimethyl-6-quinolinium)amine di-methosulphate.

The new quinoline derivatives are, therefore, effective in the control of those economically important diseases of domestic animals which are due to Babesiae (Piroplasms) and organisms of related genera, for example Redwater Fever (due to *Babesia bigemina*) and East Coast Fever (due to *Theileria parva*) in African cattle, and infections due to *Babesia bovis* in European cattle.

According to a further feature of the invention we provide a process for the manufacture of the said new quaternary salts which comprises interaction of a compound of the formula:

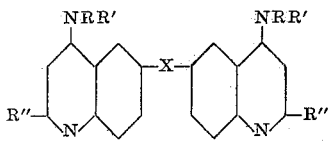

wherein R, R', R" and X have the meaning stated above, with a quaternary salt-forming agent of the formula:

R'''Z wherein R''' and Z have the meaning stated above.

The starting materials of the stated formula which, according to the invention, are to be caused to interact with the said quaternary salt forming agents, may be obtained by treating the corresponding 4:4'-dihalogeno compounds with ammonia, a monoalkylamine or a dialkylamine. Furthermore the said 4:4'-dihalogeno compounds may be obtained by action of for example phosphorus oxychloride on the corresponding 4:4'-dihydroxy compounds which themselves may be obtained by ring closure by heat of the condensation product of, for example, an acetoacetic ester with a compound of the formula:

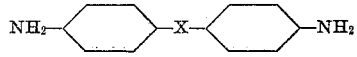

wherein X has the meaning stated above.

As suitable quaternary salt-forming agents of the formula R'''Z there may be mentioned for example methyl p-toluenesulphonate, methyl iodide, and dimethylsulphate.

A quaternary salt so obtained may be converted into the corresponding salt of another anion by treatment thereof with a salt of the said other anion. Such treatment is in some cases the most convenient method of manufacture of a quaternary salt of a particular anion.

According to a further feature of the invention therefore, we provide a process for the manufacture of the said new quaternary salts which comprises interaction of a compound of the formula:

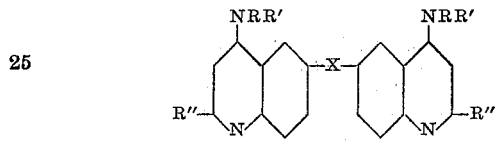

wherein R, R', R" and X have the meaning above, with a quaternary salt-forming agent of the formula:

R'''Z' wherein R''' has the meaning stated above and Z' stands for an anionic group which may optionally be the same as Z and thereafter treating the quaternary salt so formed with a salt containing an anionic group of the formula Z wherein Z has the meaning stated above.

As suitable quaternary salt-forming agents of the formula R'''Z' wherein R''' and Z' have the meaning stated above there may be mentioned for example methyliodide and methyl p-toluenesulphonate.

As suitable salts containing an anionic group of the formula Z wherein Z has the meaning stated above, there may be mentioned for example silver halides for example silver chloride and alkali metal chlorides for example sodium chloride.

The interaction with the quaternary salt-forming agent may be brought about by heating the reagents together, conveniently in the presence of a suitable solvent. As suitable solvents, there may be mentioned for example 2-methoxyethanol and nitrobenzene.

The invention is illustrated but not limited by the following examples in which the parts are by weight.

Example 1

10 parts of di-(4-amino-2-methyl-6-quinolyl)amine and 20 parts of methyl p-toluene-sulphonate are heated together at 140° C. for 1 hour. The mixture is then cooled and diluted with 320 parts of boiling methanol. The solid is then filtered off and is crystallised from water. Di-(4-amino-1:2-dimethyl-6-quinolinium)amine di-p-toluenesulphonate is obtained as yellow needles M. P. 249–251° C. with decomposition.

The so obtained di-p-toluene sulphonate may be converted into the corresponding chloride, if desired, as follows:

5 parts of the di-p-toluenesulphonate are dissolved in 500 parts of hot water and 20 parts of sodium chloride are added. The mixture is boiled for 2–3 minutes and the yellow solid is then filtered off and crystallised from 150 parts of 33% aqueous ethanol from which it separates as yellow needles. Di-(4-amino-1:2-dimethyl-6-quinolinium)amine dichloride, so obtained, sinters at 295–300° C. and then darkens but does not melt below 360° C.

*Example 2*

4.5 parts of di-(4-methylamino-2-methyl-6-quinolyl)-amine, 11.4 parts of methyl iodide and 24 parts of 2-methoxyethanol are heated for 30 minutes at 100° C. The mixture is cooled, diluted with 39.6 parts of acetone and the solid is filtered off. It is then crystallised from 1,000 parts of 50% aqueous ethanol and di-(4-methyl-amino-1:2-dimethyl-6-quinolinium)amine di-iodide is obtained as yellow microprisms M. P. 316° C. (decomp.).

*Example 3*

1.5 parts of di-(4-amino-2-methyl-6-quinolyl) ether, 5 parts of methyl p-toluene-sulphonate and 11.98 parts of nitrobenzene are heated together at 140–150° C. for 2 hours. The mixture is then filtered and the solid residue is washed with acetone and then dissolved in a mixture of 50 parts of water and 19.8 parts of acetone. The solution is boiled for 5 minutes with 5 parts of sodium chloride, cooled and filtered. The solid residue is crystallised from hot water and di-(4-amino-1:2-dimethyl-6-quinolinium)-ether dichloride is obtained as a pale cream crystalline solid M. P. 304–306° C. (decomp.).

*Example 4*

A mixture of 5.55 parts of di-(4-amino-2-methyl-6-quinolyl)methane, 45 parts of benzene, and 60 parts of nitrobenzene is stirred and heated to 170° C. for one hour. It is then cooled to 100° C. and 4.75 parts of dimethyl sulphate are added. The mixture is then stirred and heated at 115–120° C. for 2 hours. It is then cooled and filtered. The solid residue of di-(4-amino-1:2-dimethyl-6-quinolinium)methane di-methosulphate is washed with nitrobenzene and then with ethyl acetate, and dried. It can be recrystallised from ethanol containing 5% of water, and thus gives the dihydrate, M. P. 126–128° C.

*Example 5*

A mixture of 4.3 parts of di-(4-amino-2-methyl-6-quinolyl)sulphide and 70 parts of nitrobenzene is freed from traces of water by azeotropic distillation with benzene. 3.45 parts of dimethyl sulphate are added, and the mixture is stirred and heated at 120° C. for 3 hours. The mixture is then cooled and filtered and the residue is washed with nitrobenzene and then with ethyl acetate. It is recrystallised from ethanol containing 10% of water, to give di-(4-amino-1:2-dimethyl-6-quinolinium) sulphide di-methosulphate which decomposes at 271–274° C.

*Example 6*

A mixture of 3.85 parts of di-(4-dimethylamino-2-methyl-6-quinolyl)amine and 50 parts of nitrobenzene is freed from traces of water by azeotropic distillation with benzene. 2.65 parts of dimethylsulphate are added and the mixture is then stirred and heated at 120–125° C. for 3 hours. The mixture is cooled, filtered, and the residue is washed with nitrobenzene and then ethyl acetate. It is recrystallised from ethanol to give di-(4-dimethyl-amino-1:2-dimethyl-6-quinolinium)amine di--methosulphate which decomposes at 240–242° C.

What we claim is:

1. New quinoline derivatives which are quaternary salts of the formula

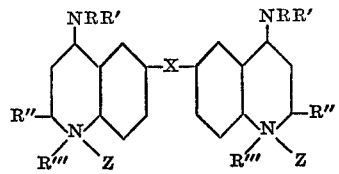

wherein X stands for a member of the group consisting of —NH—, —O—, —S—, and —CH₂—, R and R' stand for a member of the group consisting of hydrogen and lower alkyl radicals, R" and R'" stand for alkyl radicals and Z stands for an anionic group.

2. Process for the manufacture of the new quaternary salts claimed in claim 1 which comprises interaction of a compound of the formula:

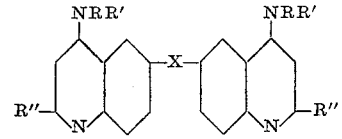

wherein R, R', R" and X have the meaning stated in claim 1, with a quaternary salt-forming agent of the formula:

wherein R'" and Z have the meaning stated in claim 1.

3. Process for the manufacture of the new quaternary salts as claimed in claim 1 which comprises reacting a compound of the formula:

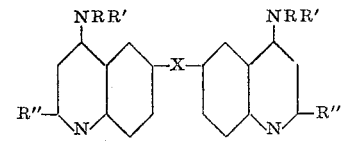

wherein R, R', R" and X have the meaning stated in claim 1, with a quaternary salt-forming agent of the formula:

wherein R'" has the meaning stated in claim 1 and Z' stands for an anionic group and thereafter treating the quaternary salt so formed with a salt containing an anionic group of the formula Z wherein Z has the meaning stated in claim 1.

4. Process as claimed in claim 2 wherein the quaternary salt-forming agent is selected from the group consisting of methyl p-toluene-sulphonate, methyliodide and dimethyl-sulphate.

5. Process as claimed in claim 3 wherein the quaternary salt-forming agent is selected from the group consisting of methyl p-toluene-sulphonate and methyliodide.

6. Process as claimed in claim 3 wherein the said salt containing an anionic group is a silver halide.

7. Process as claimed in claim 6 wherein the silver halide is silver chloride.

8. Process as claimed in claim 3 wherein the said salt containing an anionic group is an alkali metal chloride.

9. Process as claimed in claim 8 wherein the alkali metal chloride is sodium chloride.

10. Process as claimed in claim 2 wherein the reaction is brought about in a solvent medium.

11. Process as claimed in claim 10 wherein the solvent is selected from the group consisting of 2-methoxy-ethanol and nitrobenzene.

12. Di - (4 - methylamino - 1:2 - dimethyl - 6 - quino-linium)amine di - iodide.

13. Di - (4 - methylamino - 1:2 - dimethyl - 6 - quino-linium) di - methosulphate.

References Cited in the file of this patent

UNITED STATES PATENTS

| | | |
|---|---|---|
| 1,697,356 | Eisleb | July 24, 1934 |
| 2,118,244 | Jensch | May 24, 1938 |
| 2,652,396 | Keyls et al. | Sept. 15, 1953 |